United States Patent Office 2,747,639
Patented May 29, 1956

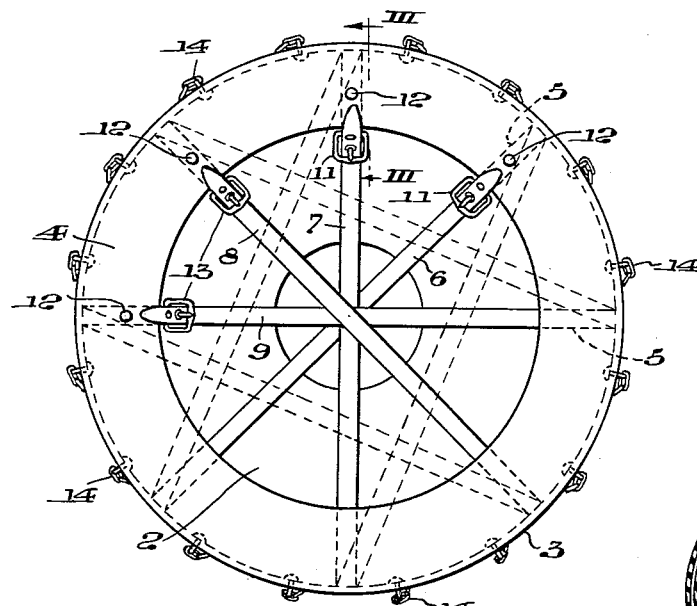
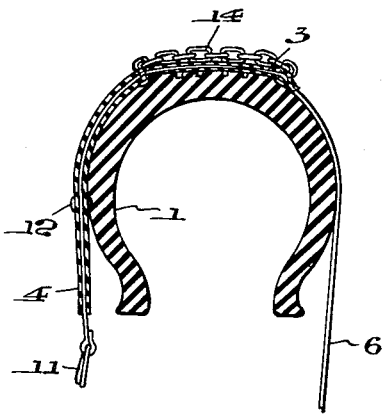
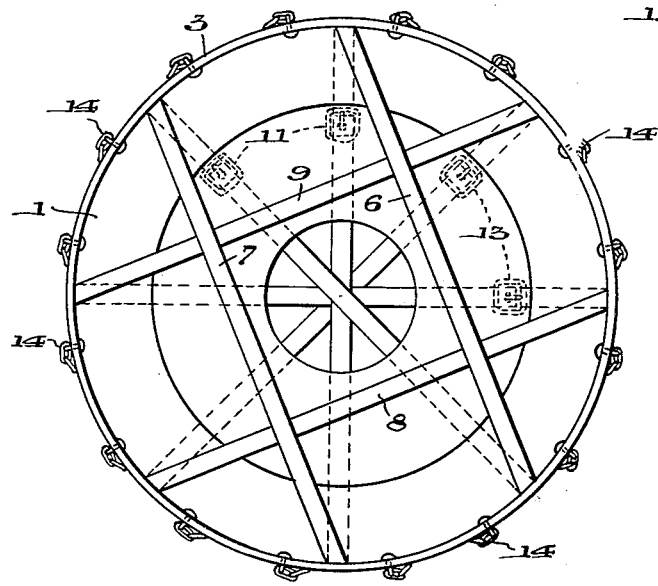
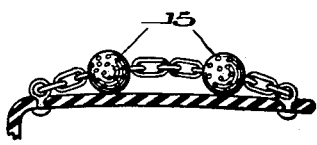

2,747,639
ANTISKID COVER FOR TIRES
Stephan Mertz, Pittsburgh, Pa.

Application June 9, 1955, Serial No. 514,194

5 Claims. (Cl. 152—173)

This invention relates to antiskid devices that can be applied to vehicle tires in emergencies.

It is among the objects of this invention to provide an antiskid device that can be quickly and easily applied to a tire on a vehicle, that can be applied to tires mounted on disc wheels, than can be applied easily without jacking up the wheel, that is fastened in place by straps at the outside of the wheel, and that holds the cross chains in their proper relative positions while they are being applied to the tire.

In accordance with this invention a ring-like cover, carrying cross chains, is provided for a vehicle tire. The body of the cover is formed from an endless band of flexible material adapted to encircle the tread of a tire in engagement with it, the outer edge of the band being provided with a radial flange which overlaps the outer sidewall of the tire. The band is applied to the tire by sliding it inward across the tread. The band and flange are provided with a number of circumferentially spaced passages extending edgewise through the material. Retaining straps extend from the front of the cover through half of the passages and across the back of the cover. They then extend forward through the remaining passages and across the front of the cover. There are buckles on the straps for connecting their ends together. The nonskid properties are obtained by cross chains which extend across the band and have their ends anchored therein near its opposite edges.

The invention is illustrated in the accompanying drawings, in which

Fig. 1 is a front or outer view of my antiskid cover applied to a tire on a wheel;

Fig. 2 is a rear or inner view of the tire with the cover thereon;

Fig. 3 is an enlarged cross section of the tire and cover taken on the line III—III of Fig. 1; and Fig. 4 is a detail of a modification of a cross chain.

Referring to the drawings, an ordinary pneumatic tire 1 is shown mounted on a solid or disc wheel 2 of a vehicle such as an automobile or truck. It can be assumed that the wheel is on the axle of the vehicle, although for clearness the axle has been omitted in the drawings. To prevent the tire from slipping on ice and snow, an antiskid cover has been applied to it. The ring-like body of this cover is formed from an endless band 3 that encircles the tire against its tread and that has an integral radial flange 4 at its outer edge only for overlapping the outer sidewall of the tire. The material of the band and flange is flexible to some extent, and preferably is rubber reinforced with plies of fabric, like the rubber in the tire. The inner or backside of the cover is completely open so that the cover can be slipped over the tire from the outside.

The band and its flange are provided in any suitable manner with an even number of passages 5 extending transversely across the cover; that is, the passages extend edgewise through the material of the cover between its plies. The passages, preferably eight in number, are spaced uniform distances apart circumferentially of the tire. For holding the cover in place on the tire, retaining straps 6, 7, 8 and 9 are provided. For best results, a pair of these straps 6 and 7 extend from the front of the cover through two adjacent passages and then across the back of the band in parallel relation as shown. They then extend forward through another two adjacent passages and diametrically across the front of the cover, crossing at the center of the wheel. A buckle 11 on one end of each strap connects it with the strap from the diametrically opposite passage. This means that the two straps 6 and 7 are connected together end to end to form a continuous lace having parallel sections behind the wheel and crossed sections in front.

Each buckle is located close to flange 4 of the cover, and the adjoining length of strap that extends through that portion of the flange preferably is fastened to it by rivets 12 or stitching to hold the buckle in fixed relation with the flange. The opposite end portion off the same strap is not fastened in its passage, but is free to slide back and forth in it. This allows the strap to be drawn up tight, by sliding through one passage, without pulling the band off the tire. It also allows the section of strap behind the wheel to be pulled out into a loose loop that can be slipped radially over the tire in order to permit the cover to be applied to or removed from the tire.

The other pair of retaining straps 8 and 9 extend in the same manner as those just described through four other passages in the cover, and are connected together by buckles 13. The parallel sections of these straps behind the wheel will therefore cross the other straps at right angles to them, whereby the cover will be held securely in place. By having the described arrangemement of straps at the inner side of the wheel, the axle and brake drum do not interfere with them, as will be evident from Fig. 2.

Extending across band 3 at suitable intervals around it are cross chains 14, the ends of which are anchored in the band in any suitable manner. The chains are fairly loose for better antiskid properties.

In the modification shown in Fig. 4, rubber balls 15 with knobby surfaces are strong on the cross chains. These improve the antiskid qualities of the chains under some driving conditions.

If the wheel is jacked up, the antiskid tire cover disclosed herein is applied to it by simply pulling enough slack into the back sections of the straps to permit them to be looped out around the band 3, and then slipping the band over the tire like placing a cover on a can. As soon as flange 4 engages the tire, the slack strap loops are pushed back behind the tire and then the free ends of the straps are pulled to stretch the straps against the back of the tire and wheel. The free ends are passed through the buckles and pulled tight.

If the tire is resting on the road, this cover is applied in the same general way just described, except that it cannot be pushed in beneath the bottom of the tire. Instead, as much of the cover is placed over the tire as possible, then the vehicle is moved ahead a little. The rotating tire will feed itself into the cover, whereupon the straps can be tightened.

With this invention the ring-like cover is held in place on a tire at eight places by tightening only four straps. It can be applied to disc wheels because the straps do not cross a tire rim. The straps are protected by the flexible cover from road wear, and the cover also protects the tire from any wear by the chains. The flange 4 serves to locate the band 3 in correct position on the tread.

According to the provisions of the patent statutes, I have explained the principle of my invention and have illustrated and described what I now consider to represent its best embodiment. However, I desire to have it understood that, within the scope of the appended claims, the

I claim:

1. An antiskid cover for a vehicle tire, comprising an endless band adapted to encircle the tread of a tire in engagement therewith and having a radial flange at one edge only for overlapping the outer sidewall of the tire, whereby the band is applied to a tire by sliding it inward across the tread, said band and flange being formed from flexible material provided with circumferentially spaced passages extending edgewise therethrough, retaining straps extending from the front of the cover through half of said passages and across the back of the cover and then forward through the remaining passages and across the front of the cover, buckles on the straps for connecting their ends together, and cross chains extending across said band and having their ends anchored therein near its opposite edges.

2. An antiskid cover for a vehicle tire, comprising an endless band adapted to encircle the tread of a tire in engagement therewith and having a radial flange at one edge only for overlapping the outer sidewall of the tire, whereby the band is applied to a tire by sliding it inward across the tread, said band and flange being formed from flexible material provided with an even number of circumferentially spaced passages extending edgewise therethrough, a pair of retaining straps extending from the front of the cover through two adjacent passages and across the back of the cover in parallel relation and then forward through two adjacent passages and diametrically across the front of the cover in crossed relation, another pair of retaining straps extending in the same manner through others of said passages, a buckle on one end of each strap for connection to the strap from the diametrically opposite passage, and cross chains extending across said band and having their ends anchored therein near its opposite edges.

3. An antiskid cover for a vehicle tire, comprising an endless band adapted to encircle the tread of a tire in engagement therewith and having a radial flange at one edge only for overlapping the outer sidewall of the tire, whereby the band is applied to a tire by sliding it inward across the tread, said band and flange being formed from flexible material provided with an even number of circumferentially spaced passages extending edgewise therethrough, a pair of retaining straps extending from the front of the cover through two adjacent passages and across the back of the cover in parallel relation and then forward through two adjacent passages and diametrically across the front of the cover in crossed relation, another pair of retaining straps extending in the same manner through others of said passages, a buckle on one end of each strap for connection to the strap from the diametrically opposite passage, each of said buckles being located close to said flange, means anchoring the buckle end of each strap in the passage containing it, and cross chains extending across said band and having their ends anchored therein near its opposite edges.

4. An antiskid cover for a vehicle tire, comprising an endless band adapted to encircle the tread of a tire in engagement therewith and having a radial flange at one edge only for overlapping the outer sidewall of the tire, whereby the band is applied to a tire by sliding it inward across the tread, said band and flange being formed from flexible material provided with an even number of uniformly spaced passages extending edgewise therethrough, a pair of retaining straps extending from the front of the cover through two adjacent passages and across the back of the cover in parallel relation and then forward through two adjacent passages and diametrically across the front of the cover in crossed relation, another pair of retaining straps extending in the same manner through others of said passages and with their parallel portions crossing the parallel portions of the first pair of straps at substantially right angles, a buckle on one end of each strap for connection to the strap from the diametrically opposite passage, each of said buckles being located close to said flange, means anchoring the buckle end of each strap in the passage containing it, and cross chains extending across said band and having their ends anchored therein near its opposite edges.

5. An antiskid cover according to claim 1, in which rubber balls are strung on said chains, said balls having knobby surfaces.

References Cited in the file of this patent

UNITED STATES PATENTS

| | | |
|---|---|---|
| 1,328,539 | Niles | Jan. 20, 1920 |
| 1,486,080 | Fink | Mar. 4, 1924 |
| 2,638,954 | Anderson | May 19, 1953 |
| 2,728,371 | McCarthy | Dec. 27, 1955 |
| 2,730,156 | Ansel | Jan. 10, 1956 |